(12) United States Patent
Fan et al.

(10) Patent No.: US 11,988,270 B2
(45) Date of Patent: May 21, 2024

(54) ELECTRIC DRIVE ASSEMBLY FOR ELECTRIC VEHICLE, AND ELECTRIC VEHICLE

(71) Applicant: NIO TECHNOLOGY (ANHUI) CO., LTD, Hefei (CN)

(72) Inventors: Xin Fan, Shanghai (CN); Chuanwei Ren, Shanghai (CN); Zhengcheng Huang, Shanghai (CN); Xiaochao Chu, Shanghai (CN); Yangpeng Shi, Shanghai (CN); Huiwen Zheng, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 18/060,668

(22) Filed: Dec. 1, 2022

(65) Prior Publication Data
US 2023/0175579 A1    Jun. 8, 2023

(30) Foreign Application Priority Data
Dec. 2, 2021   (CN) .......................... 202111460732.5

(51) Int. Cl.
*B60K 1/00*     (2006.01)
*B60K 17/04*    (2006.01)
*B60K 17/08*    (2006.01)
*B60K 17/16*    (2006.01)
*F16H 1/22*     (2006.01)
(Continued)

(52) U.S. Cl.
CPC .......... *F16H 37/0813* (2013.01); *B60K 1/00* (2013.01); *B60K 17/08* (2013.01); *B60K 17/165* (2013.01)

(58) Field of Classification Search
CPC .... B60K 1/00; B60K 2001/001; B60K 17/08; B60K 17/165; B60K 6/00–6/547; F16H 37/0813; F16H 48/00–2048/426
See application file for complete search history.

(56) References Cited

U.S. PATENT DOCUMENTS

| | | | |
|---|---|---|---|
| 10,760,674 B2* | 9/2020 | Ono | F16H 57/0457 |
| 2007/0093344 A1* | 4/2007 | Kira | B60K 6/48 475/150 |

(Continued)

*Primary Examiner* — Tinh Dang
(74) *Attorney, Agent, or Firm* — Sheridan Ross P.C.

(57) ABSTRACT

The disclosure relates to the technical field of electric drive assemblies, and in particular provides an electric drive assembly for an electric vehicle, and an electric vehicle. The disclosure provides an electric drive assembly composed of an input shaft integrated with an electric motor rotor and a gearbox first-stage driving gear, three intermediate shafts each integrated with a gearbox first-stage driven gear and a second-stage driving gear, and a differential integrated with a second-stage driven gear. The three intermediate shafts are evenly disposed around the input shaft. The power of the electric motor is transmitted from the first-stage driving gear to the second-stage driven gear on the differential evenly through the three intermediate shafts. The structure has a small size, a light weight, and a large ability to transmit loads, thereby avoiding the problem of poor manufacturing precision of the planetary gear and the ring gear used in the traditional coaxial electric drive assembly structure, and providing a better NVH performance.

9 Claims, 3 Drawing Sheets

(51) Int. Cl.
*F16H 37/08* (2006.01)
*F16H 48/08* (2006.01)

(56) References Cited

U.S. PATENT DOCUMENTS

| | | | |
|---|---|---|---|
| 2015/0330492 A1* | 11/2015 | Lee | F16H 37/0813 475/331 |
| 2018/0172138 A1* | 6/2018 | Nakano | F16H 37/0813 |
| 2018/0328480 A1* | 11/2018 | Nakano | B60K 17/165 |
| 2021/0071751 A1* | 3/2021 | Fujii | H02K 9/193 |
| 2023/0044400 A1* | 2/2023 | Yasui | B60K 1/00 |

* cited by examiner

ELECTRIC DRIVE ASSEMBLY FOR ELECTRIC VEHICLE, AND ELECTRIC VEHICLE

CROSS-REFERENCE TO RELATED APPLICATIONS

This application claims the benefit of China Patent Application No. 202111460732.5 filed Dec. 2, 2021, the contents of which are incorporated herein by reference in its entirety.

TECHNICAL FIELD

The disclosure relates to the technical field of electric drive assemblies, and in particular provides an electric drive assembly for an electric vehicle, and an electric vehicle.

BACKGROUND

Electric vehicles are clean energy vehicles, and are therefore becoming a major development trend with the vigorous promotion of energy conservation and emission reduction. Electric drive assemblies are important components in new energy vehicles. An existing electric drive assembly usually consists of three relatively independent parts: an electric motor, a controller and a transmission gearbox. As the transmission gearbox is an essential part of the electric vehicle, the design form of the transmission gearbox structure is critical. At present, most of the transmission gearboxes of new energy vehicles are of a parallel shaft structure, and there are also a small number of gearboxes of a coaxial structure, such as an offset coaxial structure and a planetary gearset coaxial structure. In the process of configuring the transmission gearbox, the problems of noise, vibration and harshness should also be considered. At present, the commonly used gearbox of an offset coaxial structure has a large center distance, so it is not conducive to the X-direction spatial layout of the vehicle and also not conducive to the design of high rotation speed and high output torque. The traditional gearbox of a planetary gearset coaxial structure has a small center distance, but there are a lot of gears, and there are also ring gears difficult to process, the overall NVH (noise, vibration and harshness) problems of the gearbox are difficult to solve, and the required parts and components are expensive to manufacture.

Accordingly, there is a need in the art for a new gearbox structure for an electric vehicle to solve the problems of noise, vibration and harshness of the existing gearbox of a planetary gearset coaxial structure, and the problems of a large number of gears to be meshed, the difficulty of precise control and the high manufacturing cost of parts and components, as well as the problem of the gearbox of an offset coaxial structure requiring a larger center distance to transmit the same torque.

BRIEF SUMMARY

In order to solve the above problems in the prior art, that is, in order to solve the poor noise, vibration and harshness performance of the gearbox of a planetary gearset coaxial structure, and the problem of the gearbox with the offset coaxial structure requiring a larger center distance to transmit the same torque, the disclosure provides a transmission gearbox for an electric vehicle, the transmission gearbox comprising a gearbox input shaft and intermediate shafts, wherein one end of the gearbox input shaft is configured to be connectable to an electric motor of the electric vehicle, and a sidewall of the gearbox input shaft is provided with a first-stage driving gear; and there are three intermediate shafts which are evenly distributed outside and around an axis of the gearbox input shaft, each intermediate shaft is provided with a first-stage driven gear, and the three first-stage driven gears are respectively meshed with the first-stage driving gear.

In a preferred technical solution of the transmission gearbox for an electric vehicle, the transmission gearbox further comprises a second-stage driven gear, coaxially disposed with the gearbox input shaft, each intermediate shaft is provided with a second-stage driving gear, the three second-stage driving gears are respectively meshed with the second-stage driven gear, such that the first-stage driving gear, the first-stage driven gear, the second-stage driving gears, and the second-stage driven gear together form a two-stage three-intermediate-shaft coaxial gear set.

In a preferred technical solution of the transmission gearbox for an electric vehicle, the gearbox input shaft is provided with a central through hole.

The disclosure further provides an electric drive assembly for an electric vehicle, the electric drive assembly further comprising an electric motor, a differential, a first axle shaft, a second axle shaft, a first wheel and a second wheel, wherein an output shaft of electric motor is connected to the gearbox input shaft, the gearbox input shaft is connected to the second-stage driven gear via the intermediate shafts, and the second-stage driven gear is connected to the differential;

one end of the first axle shaft passes through the central hole and is then connected to a first end axle shaft gear of the differential, and the other end of the first axle shaft is connected to the first wheel; and one end of the second axle shaft is connected to a second end axle shaft gear of the differential, and the other end of the second axle shaft is connected to the second wheel.

In a preferred technical solution of the transmission gearbox for an electric vehicle, the output shaft of the electric motor is integrally formed with the gearbox input shaft.

In a preferred technical solution of the transmission gearbox for an electric vehicle, the second-stage driven gear and the differential are integrally welded to each other or are connected to each other via bolts.

In a preferred technical solution of the transmission gearbox for an electric vehicle, the transmission gearbox further comprises a casing, the gearbox input shaft passes through the casing and is then connected to the output shaft of the electric motor, and the differential is disposed inside the casing and is connected to the second-stage driven gear.

In a preferred technical solution of the transmission gearbox for an electric vehicle, the gearbox input shaft is connected to the differential via a bearing.

In a preferred technical solution of the transmission gearbox for an electric vehicle, the first axle shaft and/or the second axle shaft are/is connected to the axle shaft gear(s) of the differential via splines.

The disclosure further provides an electric vehicle, comprising an electric drive assembly for an electric vehicle according to any one of the foregoing technical solutions.

It can be understood by those skilled in the art that, in the technical solutions of the disclosure, an electric drive assembly for an electric vehicle is provided, the electric drive assembly being provided with a transmission gearbox, wherein the transmission gearbox comprises a gearbox input shaft and intermediate shafts, wherein one end of the gearbox input shaft is configured to be connectable to an electric motor of the electric vehicle, and a sidewall of the gearbox input shaft is provided with a first-stage driving gear; and there are three intermediate shafts which are evenly distributed outside and around an axis of the gearbox input shaft, each intermediate shaft is provided with a first-stage driven gear, and the three first-stage driven gears are respectively meshed with the first-stage driving gear.

Through the above arrangement, the three intermediate shafts of the disclosure are coaxial, and there is no need to design a ring gear, so that the spatial layout of the vehicle is facilitated while providing a good NVH performance, and a bracket for supporting the differential is also omitted, enabling a simple structure and lower costs. Moreover, compared with the offset coaxial design, the coaxial structure having three intermediate shafts has a smaller center distance while providing the same output torque, the reduction of the center distance enables reduction of the diameters of the gears and the shafts, so the gear width can be reduced. Such a design is more conducive to the design of high-speed rotating members. The torque is shared by the three intermediate shafts, and the lightweight design of the geared shaft is thus ensured while providing higher output torque. In addition, although there are three intermediate shafts in number, the overall volume and weight are reduced. Furthermore, the arrangement of the structure having three intermediate shafts enables the input shaft and the output shaft to be evenly loaded, reduces friction, and improves the transmission efficiency. Therefore, the disclosure generally makes the center distance smaller, the space occupied in the vehicle is smaller, fewer gear sets are used, the overall NVH performance is better, and the machining difficulty reduced as no ring gear is involved, so that the production and assembly costs can be significantly reduced.

BRIEF DESCRIPTION OF THE SEVERAL VIEWS OF THE DRAWINGS

An electric drive assembly for an electric vehicle of the disclosure will be described below with reference to the accompanying drawings. In the accompanying drawings.

LIST OF REFERENCE SIGNS

Figure 1:
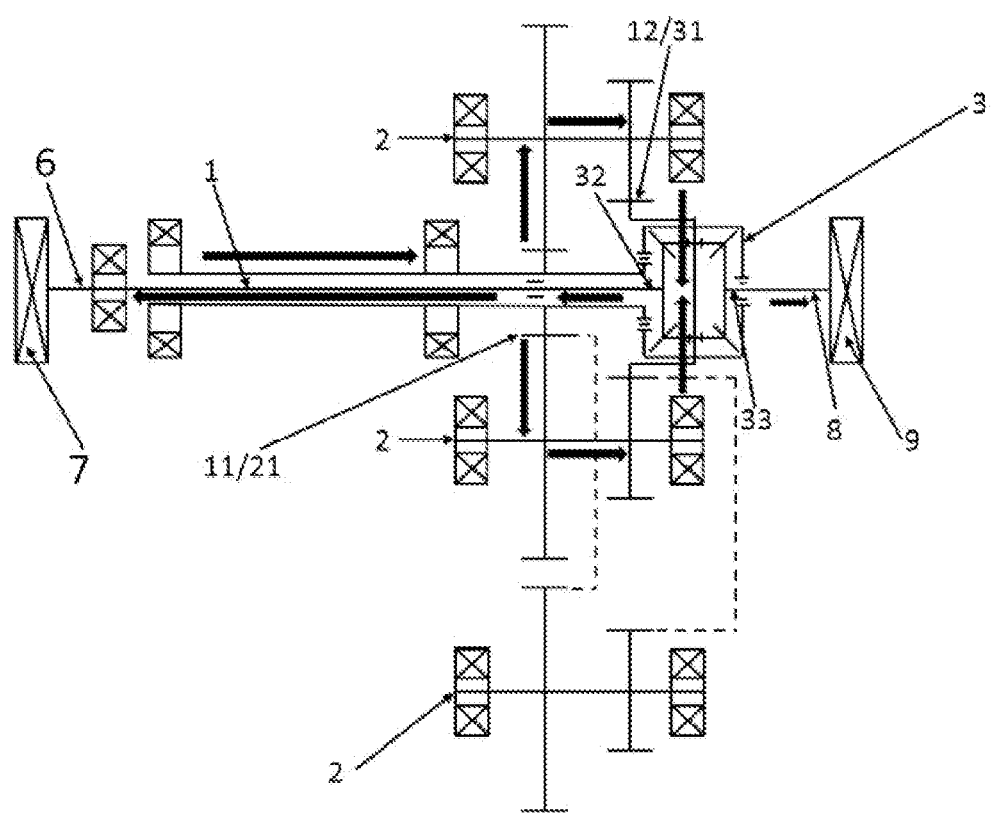
FIG. 1 is a schematic diagram of a force transfer path of an electric drive assembly for an electric vehicle according to the disclosure.

1—Gearbox input shaft, 11—First-stage driving gear, 12—Second-stage driving gear, 13—Central hole, 2—Intermediate shaft, 21—First-stage driven gear, 3—Differential, 31—Second-stage driven gear, 32—First end axle shaft gear, 33—Second end axle shaft gear, 4—Electric motor, 5—Transmission gearbox, 51—Casing, 6—First axle shaft, 7—First wheel, 8—Second axle shaft, 9—Second wheel, 10—Output shaft of the electric motor, 14—Bearing.

DETAILED DESCRIPTION

Preferred embodiments of the disclosure are described below with reference to the accompanying drawings. Those skilled in the art should understand that these implementations are only used to explain the technical principles of the disclosure, and are not intended to limit the scope of protection of the disclosure. Those skilled in the art can make adjustments according to requirements so as to adapt to specific application scenarios. For example, although in the specification, the connection between the first axle shaft and the differential, and the connection between the second axle shaft and the differential of the electric drive assembly are performed by means of splines, the first and second axle shafts may also be connected to the differential by means of a gear or a coupling in an interference fit with a shaft, i.e., by means of a flat key, as long as the arrangement ensures that the first and second axle shafts are connected in a cooperative manner.

It should be noted that in the description of the disclosure, the terms, such as "center", "upper", "lower", "left", "right", "vertical", "horizontal", "inner" and "outer", that indicate directions or positional relationships are based on the directions or positional relationships shown in the drawings only for convenience of description, and do not indicate or imply that the device or element must have a specific orientation, be constructed and operated in a specific orientation, and therefore cannot be construed as limitation to the disclosure. In addition, the terms "first", "second", and "third" are for descriptive purposes only, and may not be interpreted as indicating or implying relative importance.

In addition, it should also be noted that in the description of the disclosure, the terms "install", "interface" and "connect" are to be understood in a broad sense, for example, it can be a fixed connection, detachable connection, or integral connection; a mechanical connection or electrical connection; a direct connection or indirect connection through an intermediate medium, and internal communication between two elements, unless expressly specified and defined otherwise. For those skilled in the art, the specific meaning of the above-mentioned terms in the disclosure can be interpreted according to the specific situation.

Referring first to FIGS. 1 to 4, an electric drive assembly for an electric vehicle according to the disclosure will be described.

Figure 2:
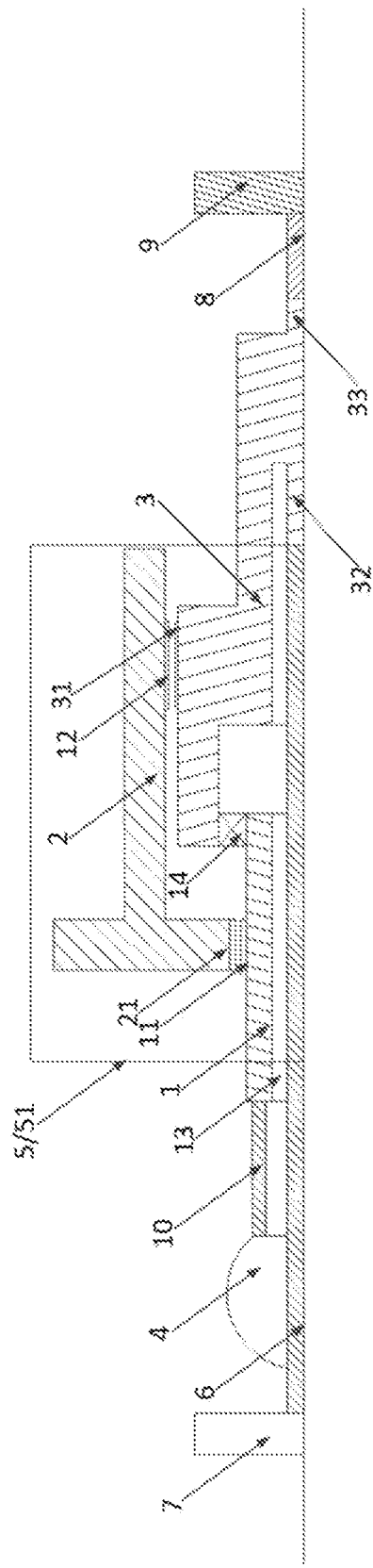
FIG. 2 is a partial schematic diagram of the electric drive assembly for an electric vehicle according to the disclosure.
Figure 3:
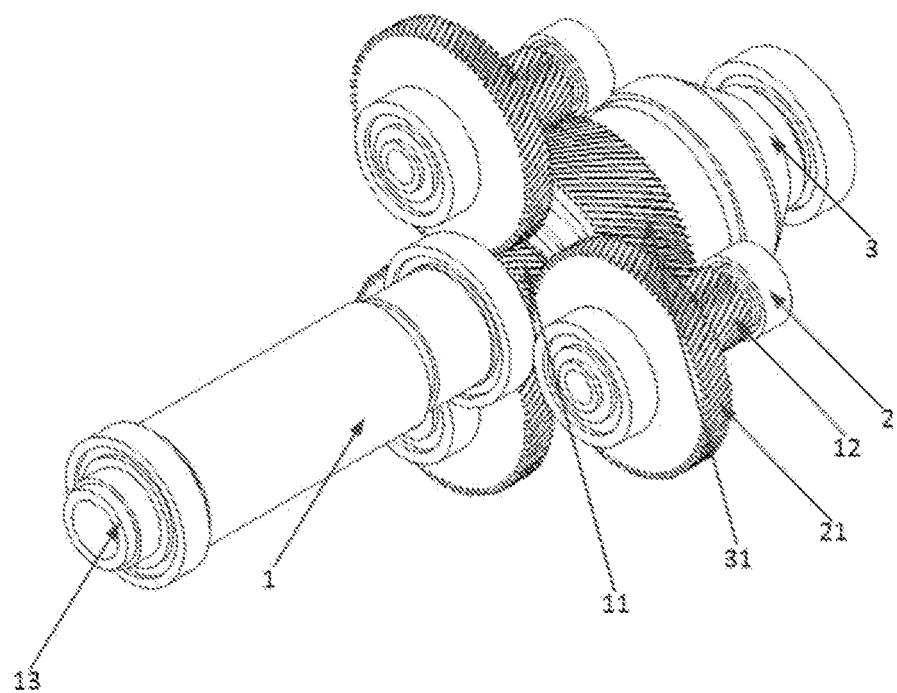
FIG. 3 is a structural diagram of the electric drive assembly for an electric vehicle according to the disclosure.
Figure 4:
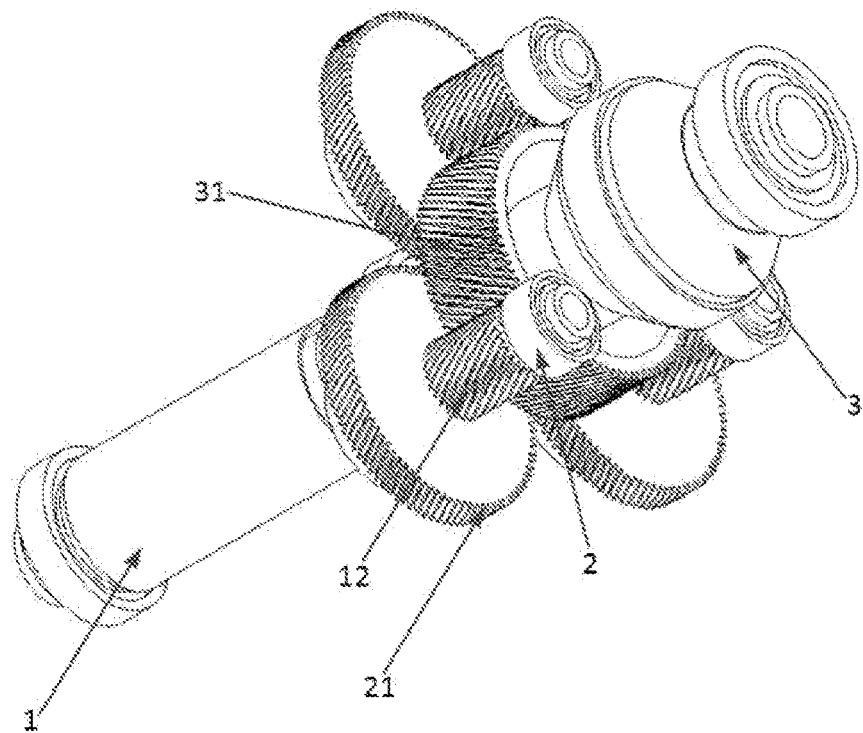
FIG. 4 is a structural diagram of the electric drive assembly for an electric vehicle according to the disclosure.

As shown in FIGS. 1 to 4, in order to solve the problem of NVH in the existing electric drive assembly, as well as the problems of a large number of gears to be meshed, the difficulty of precise control, the high manufacturing cost of parts and components, and a larger center distance, the disclosure provides an electric drive assembly for an electric vehicle. The electric drive assembly for the electric vehicle comprises a transmission gearbox 5. The transmission gearbox 5 is provided with a gearbox input shaft 1 and intermediate shafts 2. One end of the gearbox input shaft 1 is configured to be connectable to an electric motor 4 (obscured and not shown in FIG. 1, and briefly shown in FIG. 2) of the electric vehicle, and a sidewall of the gearbox input shaft 1 is provided with a first-stage driving gear 11. There are three intermediate shafts 2 (one shown in FIG. 2, and three shown in FIGS. 3 and 4). The three intermediate shafts 2 are evenly distributed outside and around an axis of the gearbox input shaft 1, each intermediate shaft 2 is provided with a first-stage driven gear 21, and the three first-stage driven gears 21 are respectively meshed with the first-stage driving gear 11. Preferably, in a possible implementation, the transmission gearbox 5 further comprises a second-stage driven gear 31. The second-stage driven gear 31 is coaxially disposed with the gearbox input shaft 1, each intermediate shaft 2 is provided with a second-stage driving gear 12, the three second-stage driving gears 12 are respectively meshed with the second-stage driven gear 31, such that the first-stage driving gear 11, the first-stage driven gears 21, the second-stage driving gears 12, and the second-stage driven gear 31 together form a two-stage three-intermediate-shaft coaxial gear set, thereby enhancing the stability of its overall gear transmission efficiency. Preferably, as shown in FIG. 2, in another possible implementation, the gearbox input shaft 1 is further provided with a central through hole 13.

As the transmission gearbox 5 is provided with the three intermediate shafts 2, the provision of the three intermediate shafts 2 enables a force to be divided into three components to be transferred, such that a larger torque is transferred, and the design of the intermediate shafts 2, the number of which is set to three, is more conducive to the stability of the gearbox. Compared with the conventional electric drive assembly of an offset coaxial structure or of a planetary coaxial structure, the even distribution of the three intermediate shafts 2 outside and around the axis of the gearbox input shaft 1 has the following advantages: first, the arrangement of the three intermediate shafts 2 enables an inner ring gear to be omitted, which has low precision and large error deformation and is difficult to machine, so that the difficulty of production can be reduced while saving costs; and the use of the structure of the two-stage three-intermediate-shaft coaxial gear set facilitates the change in the rotation speed and the generation of low noise, and the NVH performance of the electric drive system can be significantly improved. In addition, the output torque of the output shaft 10 of the electric motor is constant, the torque is the product of the force and the force arm, and the output shaft 10 of the electric motor transmits the same force to the intermediate shaft(s) 2; therefore, the torque required by the traditional offset intermediate shaft 2 is larger, while the three intermediate shafts 2 will equally share a certain force, and the required torque is smaller. Therefore, the center distance of the gears of the three intermediate shafts 2 is smaller than the center distance of the conventional offset coaxial electric drive assembly, and the reduction of the center distance enables reduction of the diameters of the gears and the shafts, thereby reducing the cost. Compared with the traditional electric drive assembly, the use of the three intermediate shafts 2 enables reduction of the gear width. Although three intermediate shafts 2 are used, the overall volume and weight are reduced. In addition, the design of the three intermediate shafts 2 makes the volume of the electric drive assembly smaller, which is more conducive to the layout of the vehicle.

Further referring to FIGS. 1 to 4, the electric drive assembly for the electric vehicle according to the disclosure will be described below in detail.

The electric drive assembly of the disclosure further comprises an electric motor 4, a differential 3, a first axle shaft 6, a second axle shaft 8, a first wheel 7 and a second wheel 9, which work together with the transmission gearbox 5. The transmission gearbox 5 comprises the gearbox input shaft 1 and the intermediate shafts 2. A first end of the gearbox input shaft 1 is configured to be connectable to the electric motor 4 of the electric vehicle, and a sidewall of the gearbox input shaft 1 is provided with a first-stage driving gear 11. There are three intermediate shafts 2. The three intermediate shafts 2 are evenly distributed outside and around an axis of the gearbox input shaft 1, each intermediate shaft 2 is provided with a first-stage driven gear 21, and the three first-stage driven gears 21 are respectively meshed with the first-stage driving gear 11. The transmission gearbox 5 further comprises a second-stage driven gear 31. The second-stage driven gear 31 is coaxially disposed with the gearbox input shaft 1, and a sidewall of a first end of the second-stage driven gear 31 is provided with the second-stage driven gear 31. Each intermediate shaft 2 is provided with a second-stage driving gear 12, the three second-stage driving gears 12 are respectively meshed with the second-stage driven gear 31, such that the first-stage driving gear 11, the first-stage driven gears 21, the second-stage driving gears 12, and the second-stage driven gear 31 together form a two-stage three-intermediate-shaft coaxial gear set. The gearbox input shaft 1 is further provided with a central through hole 13. An electric motor output shaft 10 of the electric motor 4 is connected to the gearbox input shaft 1, the gearbox input shaft 1 is connected to the second-stage driven gear 31 via the intermediate shafts 2, and the second-stage driven gear 31 is connected to the differential 3. One end of the first axle shaft 6 passes through the central hole 13 and is then connected to a first end axle shaft gear 32 of the differential 3, and the other end of the first axle shaft 6 is connected to the first wheel 7. One end of the second axle shaft 8 is connected to a second end axle shaft gear 33 of the differential 3, and the other end of the second axle shaft 8 is connected to the second wheel 9.

During the operation of the electric drive assembly, the gearbox input shaft 1 is connected to the electric motor 4 of the electric vehicle, the first-stage driving gear 11 on the gearbox input shaft 1 is meshed with the first-stage driven gears 21 on the three intermediate shafts 2, and the second-stage driven gear 31 is meshed with the second-stage driving gears 12 on the three intermediate shafts 2, so as to form the two-stage three-intermediate-shaft coaxial gear set together. In addition, in addition to being meshable with second-stage driving gears 12 on the intermediate shafts 2, the second-stage driven gear 31 can further reduce the speed of the electric motor output shaft 10, so that the speed of the electric motor output shaft 10 is matched with that of the wheel. In addition, the central through hole 13 provided in the gearbox input shaft 1 enables the first axle shaft 6 to directly pass through the central through hole 13, so that one end of the first axle shaft 6 passes through the central through hole 13 and is directly connected to one end of the differential 3, and the other end of the first axle shaft is connected to the first wheel 7. One end of the second axle shaft 8 is directly connected to the differential 3, and the other end thereof is directly connected to the second wheel 9. Therefore, the electric motor 4 directly drives the gearbox input shaft 1 to rotate, and simultaneously drives the three intermediate shafts 2 to move. This design of the central through hole 13 is more efficient and saves costs. In addition, the design of the structure of the two-stage three-intermediate-shaft coaxial gear set facilitates the spatial layout of the vehicle while providing a good NVH performance, and a bracket for supporting the differential 3 is also omitted, enabling a simple structure and lower costs. Moreover, compared with the offset coaxial design, such a design has a smaller center distance while providing the same output torque, the reduction of the center distance enables reduction of the diameters of the gears and the shafts, so the gear width can be reduced. Such a design is more conducive to the design of high-speed rotating members. The torque is shared by the three intermediate shafts 2, and the lightweight design of the geared shaft is thus ensured while providing higher output torque. In addition, although there are three intermediate shafts 2 in number, the overall volume and weight are reduced. Furthermore, the arrangement of the structure having three intermediate shafts 2 enables the input shaft and the output shaft to be evenly loaded, reduces friction, improves the transmission efficiency, and also facilitates product serialization.

Further referring to FIGS. 1 to 4, the electric drive assembly for the electric vehicle according to the disclosure will be described below in detail.

Preferably, in a possible implementation, the electric motor output shaft 10 and the gearbox input shaft 1 are integrally formed. This design of integrally forming the electric motor output shaft 10 and the gearbox input shaft 1 eliminates the need for intermediate connecting components, reduces costs, enables the electric motor 4 to be directly output to the gearbox input shaft 1, and reduces the number of parts. Furthermore, in a preferred implementation, the second-stage driven gear 31 and the differential 3 are integrally welded to each other. This arrangement eliminates the need for additional parts, and can also achieve the effect of reducing costs, and the reduction in quantity also brings more stable product performance. In addition, the transmission gearbox 5 further comprises a casing 51, the gearbox input shaft 1 passes through the casing 51 and is then connected to the electric motor output shaft 10, and the differential 3 is disposed inside the casing 51 and is connected to the second-stage driven gear 31. This arrangement omits a bracket for supporting the differential 3, the structure is simple, the miniaturization of the whole machine is realized, and the purpose of reducing the cost is achieved. Preferably, in a possible implementation, the gearbox input shaft 1 is connected to the differential 3 via a bearing 14. In addition, in a possible implementation, the first axle shaft 6 and/or the second axle shaft 8 are/is connected to the differential 3 in such a way that the first axle shaft 6 is connected to the first end axle shaft gear 32 of the differential 3 via splines and the second axle shaft 8 is connected to the second end axle shaft gear 33 of the differential 3 via splines. This arrangement is easier and more stable during connection and operation.

In summary, the disclosure provides an electric drive assembly for an electric vehicle, the electric drive assembly being provided with a transmission gearbox 5. The transmission gearbox 5 comprises a gearbox input shaft 1 and intermediate shafts 2. One end of the gearbox input shaft 1 is configured to be connectable to an electric motor 4 of the electric vehicle, and a sidewall of the gearbox input shaft 1 is provided with a first-stage driving gear 11. There are three intermediate shafts 2. The three intermediate shafts 2 are evenly distributed outside and around an axis of the gearbox input shaft 1, each intermediate shaft 2 is provided with a first-stage driven gear 21, and the three first-stage driven gears 21 are respectively meshed with the first-stage driving gear 11. Moreover, the second-stage driven gear 31 is coaxially disposed with the gearbox input shaft 1, each intermediate shaft 2 is provided with a second-stage driving gear 12, the three second-stage driving gears 12 are respectively meshed with the second-stage driven gear 31, such that the first-stage driving gear 11, the first-stage driven gears 21, the second-stage driving gears 12, and the second-stage driven gear 31 together form a two-stage three-intermediate-shaft coaxial gear set. Compared with the conventional electric drive assemblies of offset coaxial and planetary coaxial structures, this arrangement does not require high development cost, reduces the manufacturing cost of parts and components, reduces the number of parts and components and eliminates the need for too many high precision parts and components. The structure having a larger ring gear, namely a smaller gear and a larger ring gear, is simplified, so there is no need to provide an inner ring gear which is difficult to machine, and the three intermediate shafts 2 and the gearbox input shaft 1 cooperate together to form the two-stage three-intermediate-shaft coaxial gear set. This arrangement can significantly improve the NVH performance of the electric drive system. Moreover, the arrangement of the central through hole 13 in the gearbox input shaft 1 can omit a bracket for supporting the differential 3, which not only has a simple structure, but also reduces the cost. In addition, the center distance of the gears of the three intermediate shafts 2 is smaller than that of the conventional offset coaxial electric drive assembly, and the reduction of the center distance enables reduction of the diameters of the gears and the shafts. Compared with the offset coaxial structure, the coaxial structure having three intermediate shafts 2 has a smaller center distance while providing the same output torque, the smaller center distance is more conducive to the design of high-speed rotating members; the torque is shared by the three intermediate shafts 2, and the lightweight design of the geared shaft is thus ensured while providing higher output torque; and the use of the three intermediate shafts 2 enables reduction of the gear width. Compared with the traditional electric drive assembly, although three intermediate shafts 2 are used, the overall volume and weight are reduced. In addition, the design of the three intermediate shafts 2 makes the volume of the electric drive assembly smaller, which is more conducive to the layout of the vehicle. The structure having three intermediate shafts 2 enables the input shaft and the output shaft to be evenly loaded, reduces friction, and improves the transmission efficiency. In addition, the structure having three intermediate shafts 2 enables easy adjustment of the bearing capacity by appropriately increasing the gear width without changing the center distance, further facilitating product serialization.

It should be noted that the foregoing embodiments are only used to explain the principles of the disclosure, and are not intended to limit the scope of protection of the disclosure. Those skilled in the art can adjust the foregoing structures without departing from the principle of the disclosure, so that the disclosure is applicable to more specific application scenarios.

For example, in an alternative implementation, the connection between the electric motor output shaft 10 and the gearbox input shaft 1 may be of an integrated design, or the electric motor output shaft 10 may be coupled to the gearbox input shaft 1 via splines, as long as the matching and connection between the electric motor output shaft 10 and the gearbox input shaft 1 can be achieved. These do not depart from the principle of the disclosure, and therefore fall within the scope of protection of the disclosure.

In addition, the disclosure further provides an electric vehicle having an electric drive assembly for an electric vehicle according to any one of the foregoing implementations.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

What is claimed:

1. An electric drive assembly for an electric vehicle, the electric drive assembly being provided with a transmission gearbox, wherein the transmission gearbox comprises a gearbox input shaft and intermediate shafts, wherein one end of the gearbox input shaft is configured to be connectable to an electric motor of the electric vehicle, and a sidewall of the gearbox input shaft is provided with a first-stage driving gear; and there are three intermediate shafts which are evenly distributed outside and around an axis of the gearbox input shaft, each intermediate shaft is provided with a first-stage driven gear, and the three first-stage driven gears are respectively meshed with the first-stage driving gear, wherein the transmission gearbox further comprises a second-stage driven gear, coaxially disposed with the gearbox input shaft, each intermediate shaft is provided with a second-stage driving gear, the three second-stage driving gears are respectively meshed with the second-stage driven gear, such that the first-stage driving gear, the first-stage driven gear, the second-stage driving gears, and the second-stage driven gear together form a two-stage three-intermediate-shaft coaxial gear set; and wherein the three second-stage driving gears are disposed around the second-stage driven gear.

2. The electric drive assembly for an electric vehicle according to claim 1, wherein the gearbox input shaft is provided with a central through hole.

3. The electric drive assembly for an electric vehicle according to claim 2, the electric drive assembly further comprising an electric motor, a differential, a first axle shaft, a second axle shaft, a first wheel and a second wheel, wherein an output shaft of electric motor is connected to the gearbox input shaft, the gearbox input shaft is connected to the second-stage driven gear via the intermediate shafts, and the second-stage driven gear is connected to the differential;

one end of the first axle shaft passes through the central hole and is then connected to a first end axle shaft gear of the differential, and the other end of the first axle shaft is connected to the first wheel; and one end of the second axle shaft is connected to a second end axle shaft gear of the differential, and the other end of the second axle shaft is connected to the second wheel.

4. The electric drive assembly for an electric vehicle according to claim 3, wherein the output shaft of the electric motor is integrally formed with the gearbox input shaft.

5. The electric drive assembly for an electric vehicle according to claim 3, wherein the second-stage driven gear and the differential are integrally welded to each other or are connected to each other via bolts.

6. The electric drive assembly for an electric vehicle according to claim 3, wherein the transmission gearbox further comprises a casing, the gearbox input shaft passes through the casing and is then connected to the output shaft of the electric motor, and the differential is disposed inside the casing and is connected to the second-stage driven gear.

7. The electric drive assembly for an electric vehicle according to claim 5, wherein the gearbox input shaft is connected to the differential via a bearing.

8. The electric drive assembly for an electric vehicle according to claim 3, wherein the first axle shaft and/or the second axle shaft are/is connected to the axle shaft gear(s) of the differential via splines.

9. A vehicle, comprising the electric drive assembly according to claim 1.

* * * * *